United States Patent
Meier-Hynek et al.

[11] Patent Number: 5,970,109
[45] Date of Patent: Oct. 19, 1999

[54] METHOD FOR DISPOSING OF A COMPONENT LOCATED IN A REACTOR PRESSURE VESSEL OF A NUCLEAR REACTOR PLANT

[75] Inventors: Konrad Meier-Hynek, Herzogenaurach; Gerd Reimer, Höchstadt, both of Germany

[73] Assignee: Siemens Aktiengesellschaft, Munich, Germany

[21] Appl. No.: 09/153,209

[22] Filed: Sep. 15, 1998

Related U.S. Application Data

[63] Continuation of application No. PCT/EP97/01230, Mar. 11, 1997.

[30]  Foreign Application Priority Data

Mar. 15, 1996 [DE] Germany ............................ 196 10 102

[51] Int. Cl.⁶ .................................................. G21C 19/20
[52] U.S. Cl. ............................ 376/260; 376/262; 376/272
[58] Field of Search .................................... 376/260, 262, 376/272, 287, 461

[56]  References Cited

U.S. PATENT DOCUMENTS

| | | | |
|---|---|---|---|
| 4,696,786 | 9/1987 | Frizot et al. | 376/260 |
| 4,859,404 | 8/1989 | Richard | 376/262 |
| 5,009,836 | 4/1991 | Grimm et al. | 376/260 |
| 5,037,604 | 8/1991 | Bauer et al. | 376/260 |
| 5,633,903 | 5/1997 | Dietrich | 376/260 |

FOREIGN PATENT DOCUMENTS

| | | |
|---|---|---|
| 0404428A1 | 12/1990 | European Pat. Off. . |
| 0404429A1 | 12/1990 | European Pat. Off. . |
| 2585870 | 2/1987 | France . |
| 2724754 | 3/1996 | France . |
| 2724755 | 3/1996 | France . |
| 2837948 | 3/1979 | Germany . |
| 2919665 | 12/1979 | Germany . |
| 3626207A1 | 2/1987 | Germany . |
| 4445168C1 | 12/1995 | Germany . |
| 541856 | 10/1973 | Switzerland . |
| 1374593 | 11/1974 | United Kingdom . |

*Primary Examiner*—Daniel D. Wasil
*Attorney, Agent, or Firm*—Herbert L. Lerner; Laurence A. Greenberg

[57]  ABSTRACT

A method for disposing of a component located in a reactor pressure vessel of a nuclear reactor plant. The component is, in particular, a lower core structure of a pressurized water reactor plant. An upper part of a container provided for further transport is disposed above an opened and flooded reactor pressure vessel. The upper part is provided with a lower orifice. The component is raised through the orifice into the upper part of the container and is subsequently transported to an upwardly open lower part of the container. The upper part is assembled together with the lower part to form the container, so that the component is enclosed and shielded in the container.

5 Claims, 6 Drawing Sheets

METHOD FOR DISPOSING OF A COMPONENT LOCATED IN A REACTOR PRESSURE VESSEL OF A NUCLEAR REACTOR PLANT

CROSS-REFERENCE TO RELATED APPLICATION

This application is a continuation of copending International Application No. PCT/EP97/01230, filed Mar. 11, 1997, which designated the United States.

BACKGROUND OF THE INVENTION

Field of the Invention

The invention relates to a method for disposing of a component located in a reactor pressure vessel of a nuclear reactor plant.

While a nuclear reactor plant is in operation, damage to plant parts or components may occur, making it necessary to exchange those components. The old components then have to be removed and disposed of. Particularly in the case of components of the primary circuit of the nuclear reactor plant, it is necessary to accommodate the removed components in a shielded container that is suitable for further transport. Due to the radioactively contaminated surfaces, those tasks, that is to say the removal of the old component and the transfer of the latter into the shielded container, subject the operating personnel to a considerable dose of radiation. That occurs particularly in the case of large-volume components which are installed in a reactor pressure vessel in the vicinity of the fuel assemblies. Such components are, for example, a lower core structure installed in the reactor pressure vessel of a pressurized water reactor plant in order to receive the fuel assemblies.

German Published, Non-Prosecuted Patent Application DE 36 26 207 A1, corresponding to U.S. Pat. No. 4,696,786, discloses a method for exchanging internal fittings of a reactor pressure vessel. In that method, a prefabricated large-volume component made ready next to the reactor pressure vessel is inserted into the water-flooded reactor pressure vessel and fitted in. The removal of the radioactively contaminated old or spent component is not described in any more detail in those publications. They merely explain that, in order to take that component out of the reactor pressure vessel, the reactor well, in which the reactor pressure vessel is located, is previously flooded with water.

SUMMARY OF THE INVENTION

It is accordingly an object of the invention to provide a method for disposing of a component located in a reactor pressure vessel of a nuclear reactor plant, which overcomes the herein afore-mentioned disadvantages of the heretofore-known methods of this general type and through the use of which transfer into a shielded container provided for further transport is possible, while operating personnel are subjected to the least possible dose of radiation.

With the foregoing and other objects in view there is provided, in accordance with the invention, a method for disposing of a component located in a reactor pressure vessel of a nuclear reactor plant, the component in particular being a lower core structure of a pressurized water reactor plant, which comprises providing a container intended for further transport having an upper part with a lower orifice and an interior at least partly below a water level of a flooded reactor well, and placing the upper part above an opened reactor pressure vessel disposed in the flooded reactor well; picking up the component with a lifting appliance and raising the component through the lower orifice into the upper part of the container; placing an upwardly open lower part of the container next to the reactor pressure vessel in the flooded reactor well, transporting the component to the lower part of the container, and placing the component onto the lower part of the container; and assembling the upper part together with the lower part to form the container with the component enclosed in the container.

This measure prevents a situation in which the component has to be lifted out of the flooded reactor well while being transferred from the opened reactor pressure vessel into the container that is provided for further transport. The dose of radiation to which the operating personnel is subjected is thereby reduced considerably.

In accordance with another mode of the invention, a carrying structure of the lifting appliance is guided through an orifice of the upper part and is fastened to the component. As a result of this measure, the building crane that is permanently installed in the containment can be used as a lifting appliance for raising the component.

In accordance with a further mode of the invention, the orifice of the upper part of the container is closed through the use of a cover before transport to the lower part. The dose of radiation to which the operating personnel is subjected is thereby further reduced.

In accordance with a concomitant mode of the invention, water enclosed in the container is drained off into the reactor well through a closable orifice disposed in the lower part of the container. This makes it easier to further transport the container which contains the component.

Other features which are considered as characteristic for the invention are set forth in the appended claims.

Although the invention is illustrated and described herein as embodied in a method for disposing of a component located in a reactor pressure vessel of a nuclear reactor plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
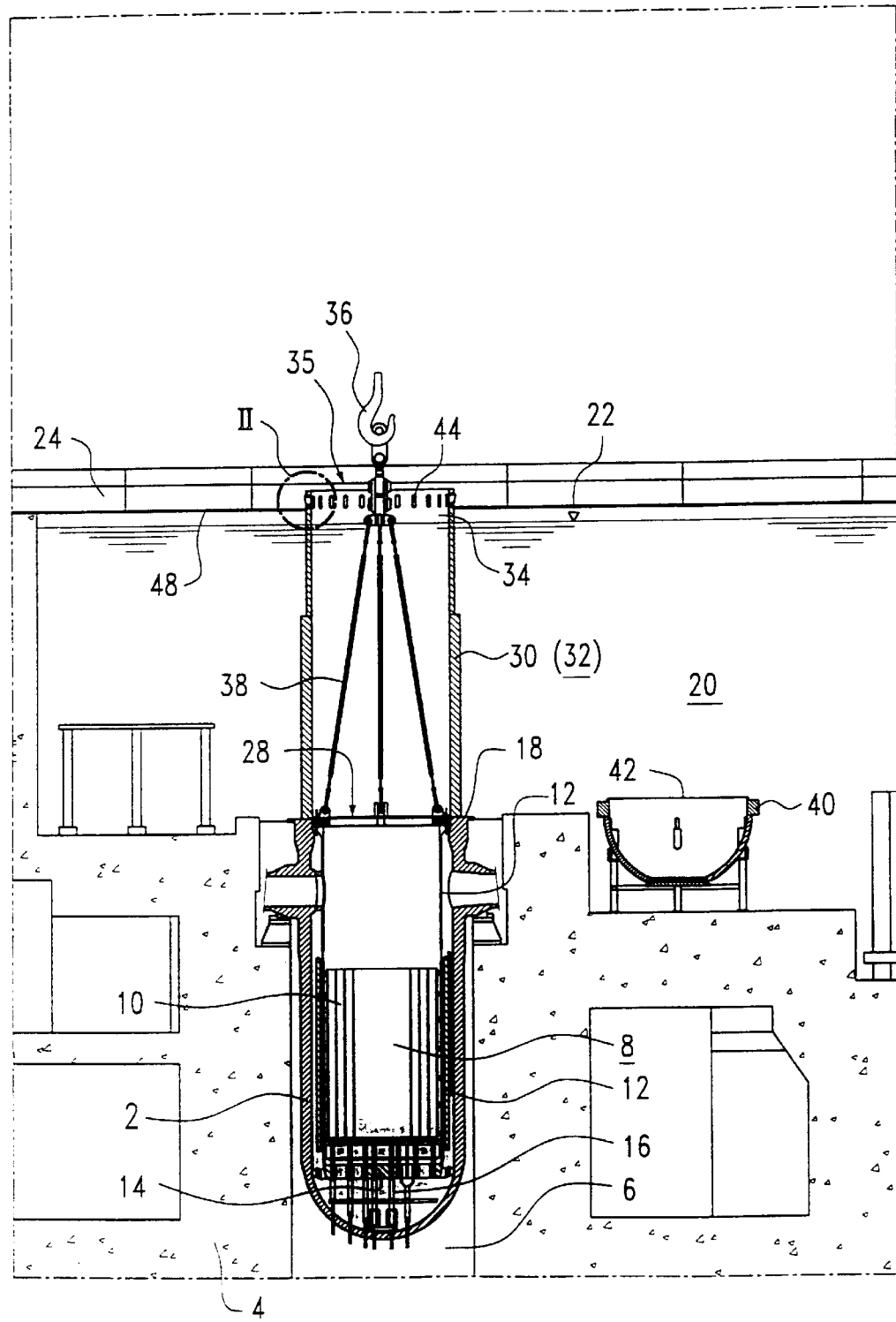
FIGS. 1, 3, 5, 7 and 8 are diagrammatic, sectional views of part of a nuclear reactor plant containing a reactor pressure vessel, which illustrate individual method steps for disposing of a lower core structure of the reactor pressure vessel according to an exemplary embodiment of the invention.

Referring now to the figures of the drawings in detail and first, particularly, to FIG. 1 thereof, there is seen a reactor pressure vessel 2 disposed in a reactor cavity 6 surrounded by concrete walls 4. A large-volume component 8, which is a lower core structure in the exemplary embodiment, is located in the reactor pressure vessel 2. The component 8 includes, as a unit, a core grid 10, a core barrel 12 and a lower grid plate 14 with supports 16. This component 8 has a longitudinal extent which corresponds approximately to the extent of the reactor pressure vessel 2, from its bottom up to its cover flange 18 in the axial direction.

The reactor cavity 6 is part of a reactor well 20 which is flooded up to a height 22 of a bridge 24 in order to work on the open reactor pressure vessel 2.

An upper part 30 of a container 32 is set down on the cover flange 18. The upper part 30 is provided at the bottom with an orifice 28 and projects only with its upper edge 34 above the water level 22. This upper part 30 is provided at the top with an orifice 35, so that a carrying structure 38 which is suspended on a crane hook 36 of a non-illustrated building crane, can be led through the orifice 35. The carrying structure in the exemplary embodiment includes a plurality of carrying ropes which are suspended on an upper edge of the component 8. In the exemplary embodiment, the upper part 30 is essentially in the form of a hollow cylinder that is open on its end surfaces, in order to ensure the freest possible access both from below and from above.

A dome-like lower part 40 of the container 32 is set down on a bottom of the reactor well 20 next to the reactor pressure vessel 2. This lower part 40 is open at the top and is disposed with its upper edge 42 approximately level with the cover flange 18.

Figure 2:
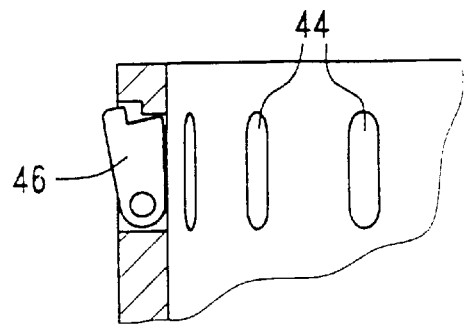
FIGS. 2, 4 and 6 are enlarged, fragmentary, sectional views of respective parts II, IV and VI of an upper edge of a container shown in FIGS. 1, 3 and 5 representing various method steps.

The upper edge 34 of the upper part 30 has a multiplicity of recesses 44 distributed about its periphery. According to FIG. 2, pawls 46 are disposed in each of the recesses 44. The pawls are capable of being pivoted into the interior of this upper part 30. Since the upper edge 34 is disposed above the water level 22, the pawls 46 can be operated manually from an auxiliary bridge 48.

Figure 3:
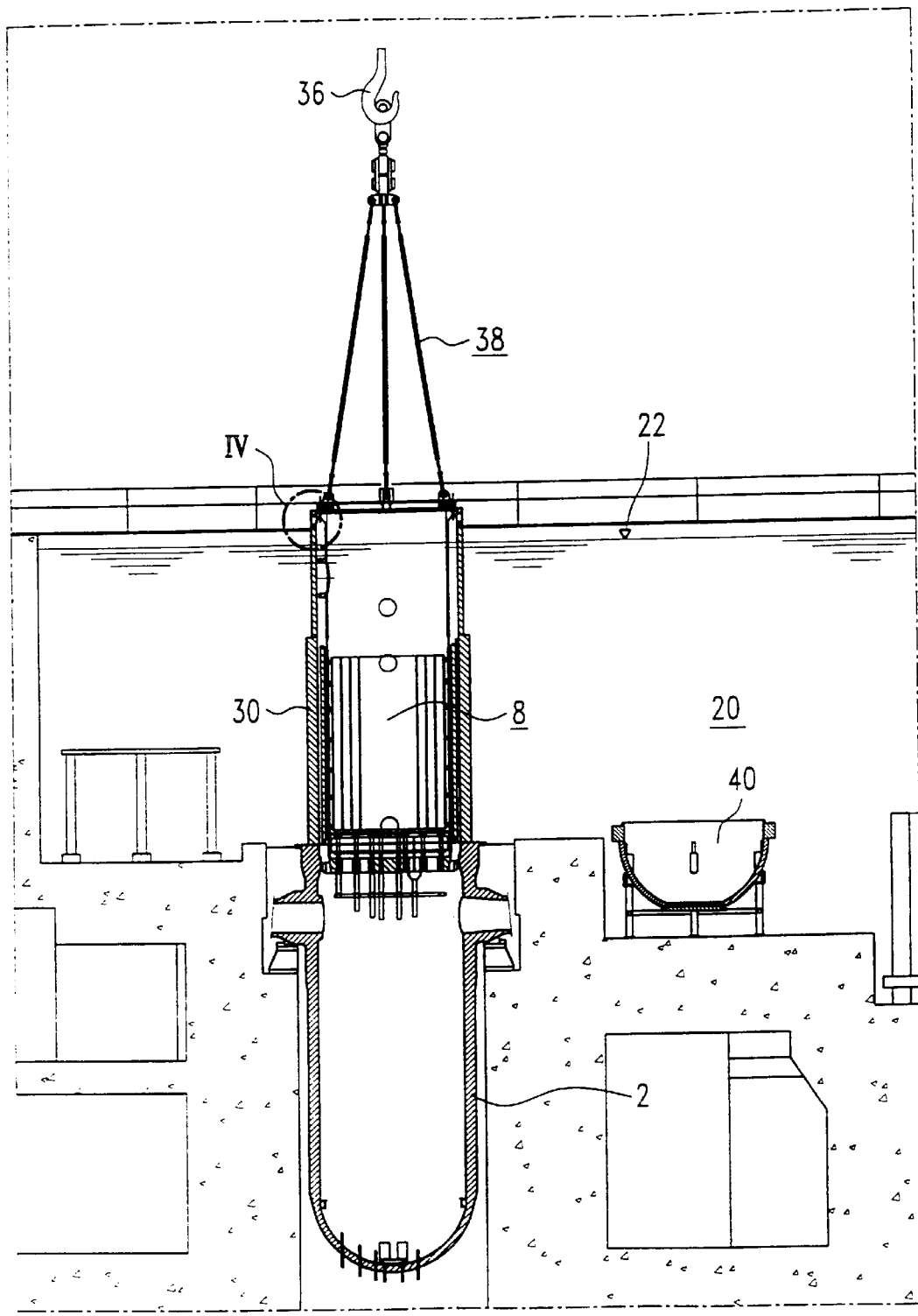

FIG. 3 illustrates how the component 8 is raised into the upper part 30, that is to say drawn into the upper part 30 from above, with the aid of the carrying structure 38 that is led through the upper part 30 and suspended on the building crane.

Figure 4:
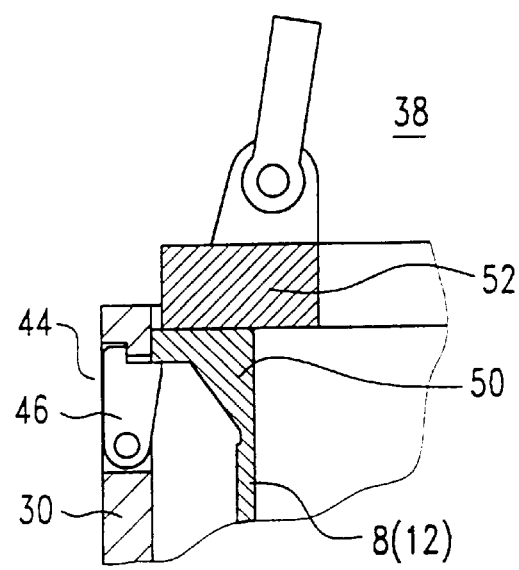

According to FIG. 4, an upper edge of the component 8 has a flange or shoulder 50. For transport purposes, the shoulder 50 is screwed to a lifting beam 52, to which the carrying structure 38 is fixed. The component 8 is guided with a lower edge of its shoulder 50 onto an inner upper edge of the recesses 44. The pawls 46 are subsequently pivoted inward, so that they engage under the shoulder 50 and thereby fix the component 8 in the upper part 30.

Figure 6:
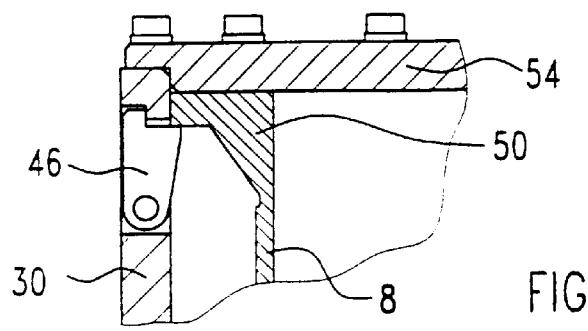
Figure 5:
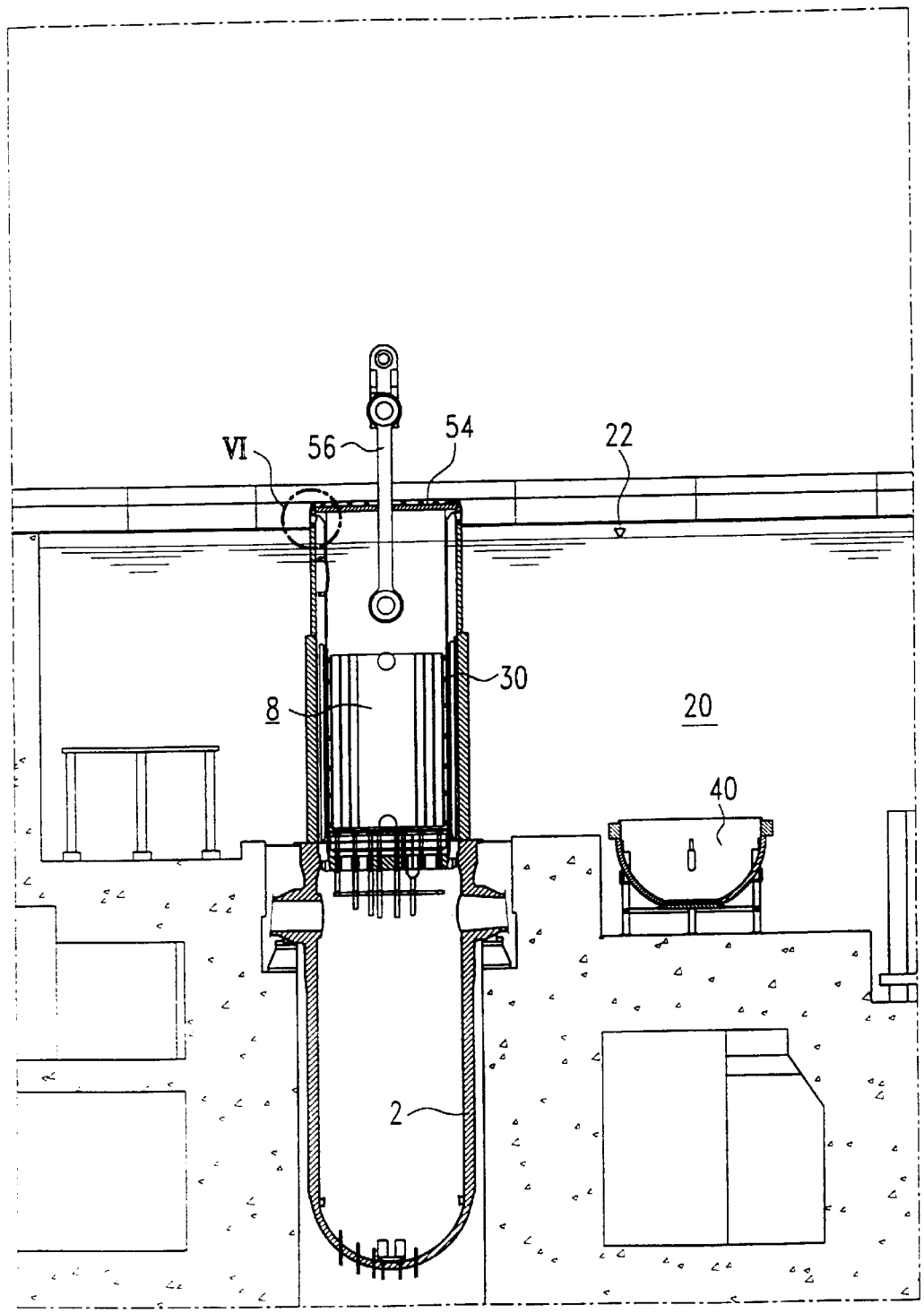

In the next method step which is explained in more detail with reference to FIGS. 5 and 6, the upper part 30 is screwed to a cover 54, as may be seen more precisely from the enlarged fragmentary view according to FIG. 6.

Figure 7:
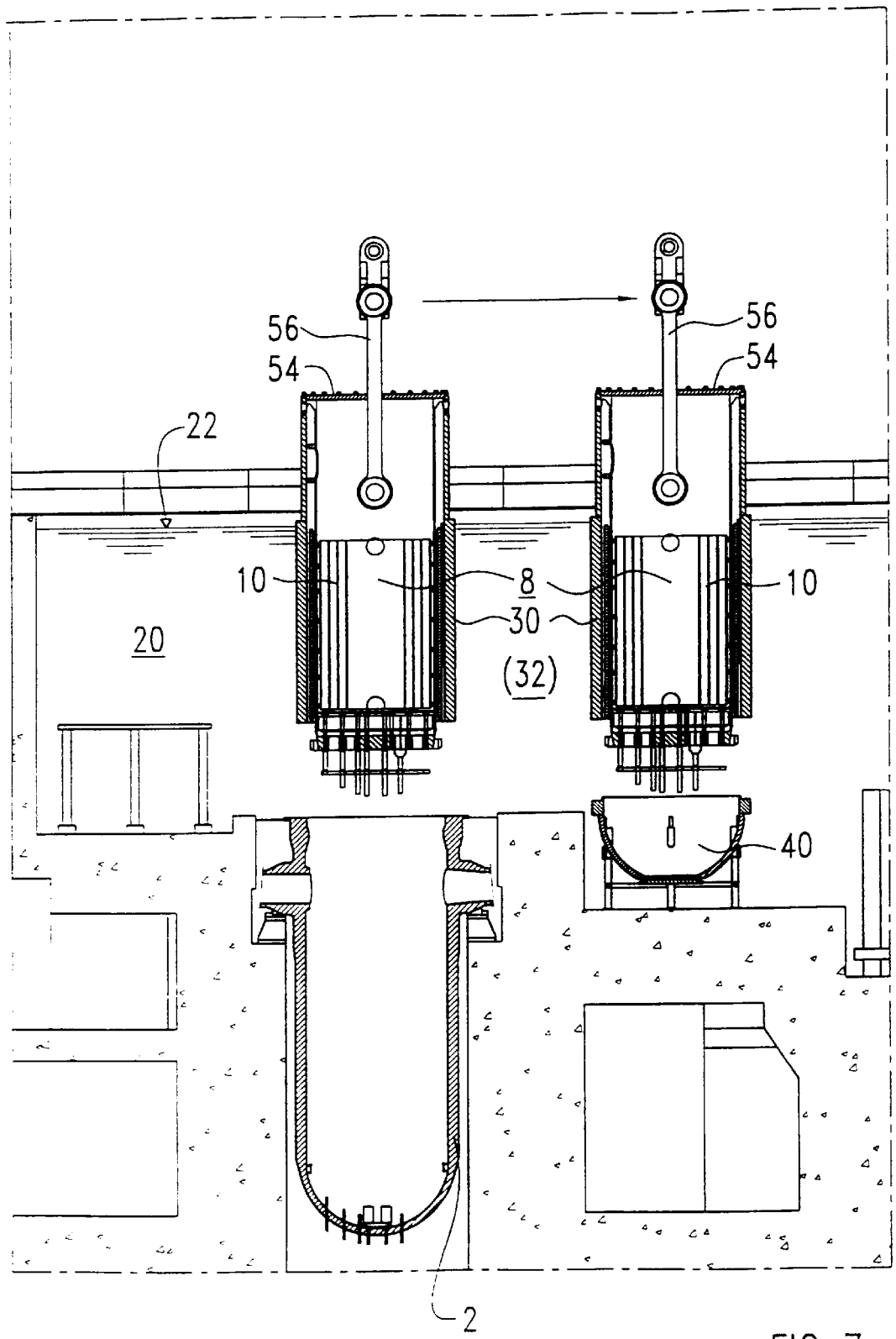
Figure 8:
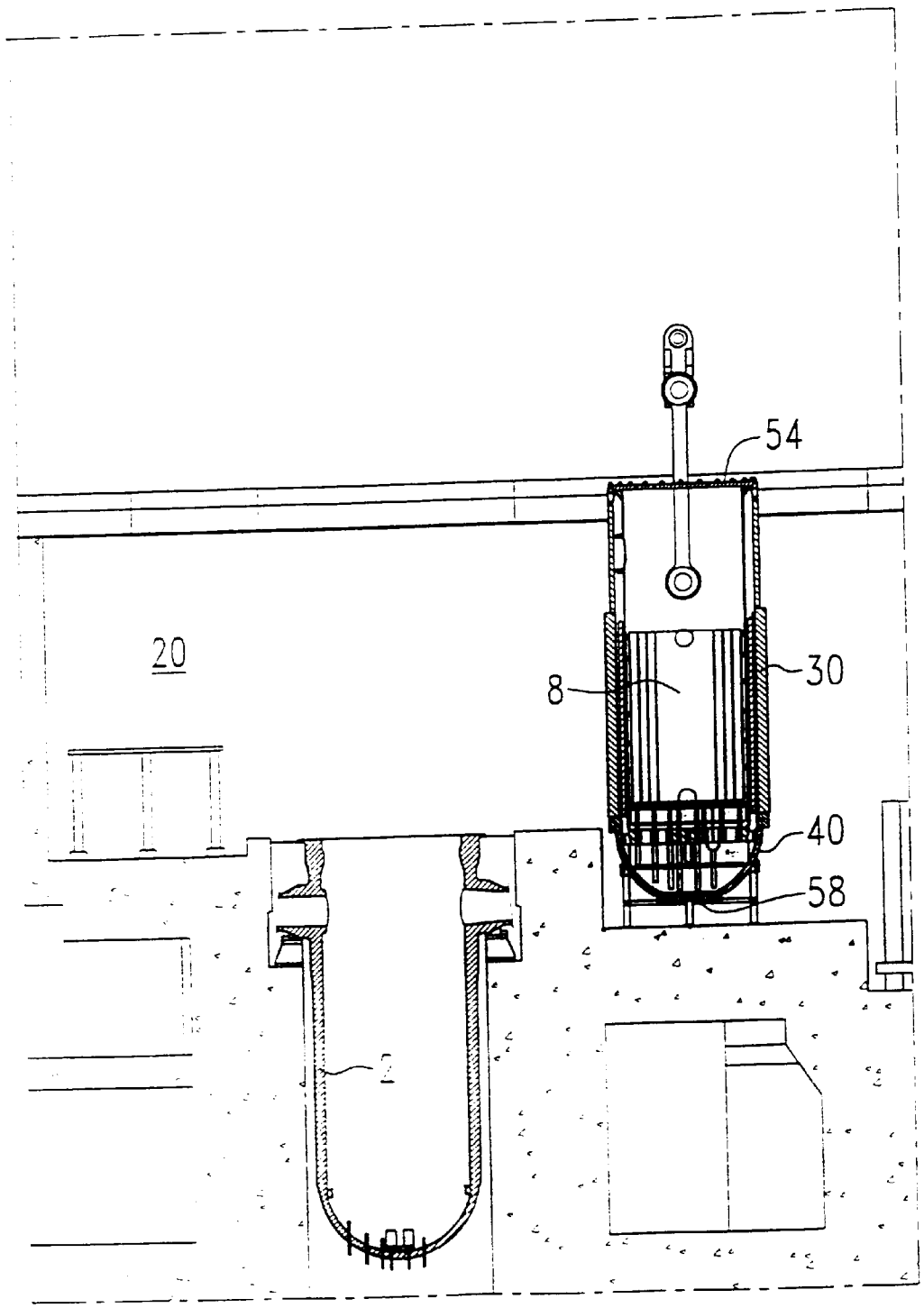

The upper part 30, that is closed at the top through the use of the cover 54, is raised with the aid of a carrying structure 56 which is fixed on the periphery of the upper part and suspended on the building crane. According to FIG. 7, the upper part 30 is moved laterally and positioned above the lower part 40. In this case, the upper part 30, together with the component 8 suspended in it, is raised only sufficiently far enough to ensure that the radioactive component parts emitting particularly intensive radiation still remain below the water level 22 during transport. Those component parts include the core grid 10 in the exemplary embodiment. Moreover, it can be seen in FIG. 7 that in this region, the upper part 30 of the container 32 has a greater wall thickness than in a region disposed above it. Therefore, the high-radiation regions of the component 8 are shielded as well as possible for subsequent transport outside the water.

The upper part 30 of the container 32 is placed onto a flange of the lower part 40 that is set down under the upper part and is assembled together with this flange, for example through the use of screws. In this state, the container 32 formed of the upper part 30, the lower part 40 and the cover 54 is filled with water above the level of the lower core grid 10. Before the container 32 is transported further, this water is emptied through a closable orifice 58 disposed in the lower part 40. This emptying operation can be carried out during or shortly after the emptying of the reactor well 20 or during or immediately after the lifting of the container 32 out of the reactor well 20.

We claim:

1. A method for disposing of a component located in a reactor pressure vessel of a nuclear reactor plant, the method which comprises:

a) providing a container intended for further transport having an upper part with a lower orifice and an interior at least partly below a water level of a flooded reactor well, and placing the upper part above an opened reactor pressure vessel disposed in the flooded reactor well;

b) picking up the component with a lifting appliance and raising the component through the lower orifice into the upper part of the container;

c) placing an upwardly open lower part of the container next to the reactor pressure vessel in the flooded reactor well, transporting the component to the lower part of the container, and placing the component onto the lower part of the container; and d) assembling the upper part together with the lower part to form the container with the component enclosed in the container.

2. The method according to claim 1, wherein the component is a lower core structure of a pressurized water reactor plant.

3. The method according to claim 1, which comprises guiding a carrying structure of the lifting appliance through an upper orifice of the upper part and fastening the carrying structure to the component.

4. The method according to claim 3, which comprises closing the upper orifice of the upper part of the container with a cover before transport to the lower part of the container.

5. The method according to claim 4, which comprises draining off water enclosed in the container into the reactor well through a closable orifice disposed in the lower part of the container.

\* \* \* \* \*